(12) United States Patent
Ma (10) Patent No.: US 11,347,055 B2
(45) Date of Patent: May 31, 2022

(54) AUGMENTED REALITY DISPLAY APPARATUS AND AUGMENTED REALITY DISPLAY METHOD

(71) Applicant: BOE TECHNOLOGY GROUP CO., LTD., Beijing (CN)

(72) Inventor: Xinli Ma, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 987 days.

(21) Appl. No.: 16/070,841

(22) PCT Filed: Jan. 5, 2018

(86) PCT No.: PCT/CN2018/071535
§ 371 (c)(1),
(2) Date: Jul. 18, 2018

(87) PCT Pub. No.: WO2018/227954
PCT Pub. Date: Dec. 20, 2018

(65) Prior Publication Data
US 2021/0208394 A1    Jul. 8, 2021

(30) Foreign Application Priority Data

Jun. 16, 2017 (CN) .......................... 201710461541.8

(51) Int. Cl.
*G02B 27/00* (2006.01)
*G02B 27/01* (2006.01)
(Continued)

(52) U.S. Cl.
CPC ....... *G02B 27/0172* (2013.01); *G02B 5/3025* (2013.01); *G02B 27/283* (2013.01);
(Continued)

(58) Field of Classification Search
CPC .......... G02B 27/0172; G02B 5/3025; G02B 27/283; G06T 7/70; G06T 11/00
See application file for complete search history.

(56) References Cited

U.S. PATENT DOCUMENTS 6,139,157 A * 10/2000 Okuyuma ............ G02B 27/283
353/102
6,262,841 B1 * 7/2001 Dike .................... G02B 27/286
359/485.02

(Continued)

FOREIGN PATENT DOCUMENTS

CN    102893307 A    1/2013
CN    104937475 A    9/2015
(Continued)

OTHER PUBLICATIONS

Hong JY, Lee CK, Lee S, Lee B, Yoo D, Jang C, Kim J, Jeong J, Lee B. See-through optical combiner for augmented reality head-mounted display: index-matched anisotropic crystal lens. Scientific reports. Jun. 5, 2017;7(1):1-1.*

(Continued)

*Primary Examiner* — Sarah Lhymn
(74) *Attorney, Agent, or Firm* — Calfee, Halter & Griswold LLP (57) ABSTRACT

An augmented reality display apparatus and method, which relates to the display technology, and may display the shielding relationship between a virtual image and a real image intuitively, so as to blend the virtual image into the real image better. The augmented reality display apparatus comprises a virtual image data extractor, a real image data extractor and an image controller. The image controller is connected with the virtual image data extractor and the real image data extractor respectively, and configured to determine coincide data based on virtual image data and real image data, and obtain visual object information of the (Continued)

coincide data, based on which a content corresponding to the visual object is controlled to be in a display state, and a content corresponding to the non-visual object is controlled to be in a non-display state. The augmented reality display apparatus may be configured to display images.

15 Claims, 7 Drawing Sheets

(51) Int. Cl.
    *G06T 7/70*     (2017.01)
    *G02B 5/30*     (2006.01)
    *G02B 27/28*     (2006.01)
    *G06T 11/00*     (2006.01)

(52) U.S. Cl.
    CPC ............... *G06T 7/70* (2017.01); *G06T 11/00* (2013.01); *G02B 2027/014* (2013.01)

(56) References Cited

U.S. PATENT DOCUMENTS

| 2005/0134803 | A1* | 6/2005 | Tseng | G03B 21/2073 |
| | | | | 353/20 |
| 2006/0192852 | A1* | 8/2006 | Rosenthal | A63F 13/54 |
| | | | | 348/61 |
| 2013/0088516 | A1 | 4/2013 | Ota et al. | |
| 2014/0177023 | A1 | 6/2014 | Gao et al. | |
| 2015/0248786 | A1* | 9/2015 | Schowengerdt | G06T 7/50 |
| | | | | 345/633 |
| 2015/0253573 | A1* | 9/2015 | Sako | G02B 27/0172 |
| | | | | 345/156 |
| 2015/0371444 | A1 | 12/2015 | Hara et al. | |
| 2017/0072800 | A1* | 3/2017 | Fujita | G01D 7/06 |
| 2017/0214907 | A1* | 7/2017 | Lapstun | G09G 3/02 |
| 2017/0299869 | A1* | 10/2017 | Urey | G02B 27/48 |
| 2018/0059419 | A1 | 3/2018 | Li et al. | |
| 2018/0084245 | A1* | 3/2018 | Lapstun | G02B 30/24 |

FOREIGN PATENT DOCUMENTS

| CN | 105005970 A | 10/2015 |
| CN | 105554392 A | 5/2016 |
| CN | 106569333 A | 4/2017 |
| CN | 107065196 A | 8/2017 |
| JP | 2011128838 A | 6/2011 |
| JP | 2014192838 A | 10/2014 |

OTHER PUBLICATIONS

Chen, H. S., Wang, Y. J., Chen, P. J., & Lin, Y. H. (2015). Electrically adjustable location of a projected image in augmented reality via a liquid-crystal lens. Optics express, 23(22), 28154-28162.*

Ohnishi, N., Kumaki, K., Yamamura, T., & Tanaka, T. (1996, April). Separating real and virtual objects from their overlapping images. In European Conference on Computer Vision (pp. 636-646). Springer, Berlin, Heidelberg.*

Search Report and Written Opinion for International Application No. PCT/CN2018/071535 dated Mar. 27, 2018.

First Office Action for Chinese Patent Application No. 201710461541.8 dated Jul. 2, 2018.

* cited by examiner

AUGMENTED REALITY DISPLAY APPARATUS AND AUGMENTED REALITY DISPLAY METHOD

RELATED APPLICATION

The present application is the U.S. national phase entry of PCT/CN2018/071535, with an international filing date of Jan. 5, 2018, which claims the benefit of Chinese Patent Application No. No. 201710461541.8, filed on Jun. 16, 2017, the entire disclosures of which are incorporated herein by reference.

FIELD

This disclosure relates to the technical field of augmented reality particularly to an augmented reality display apparatus and an augmented reality display method.

BACKGROUND

The augmented reality (AR) technology is a technology which superimposes virtual objects, scenes or system prompt information generated by the computer into the real scene, so as to realize the augment to reality. In the visualized augmented reality, the user uses an augmented reality display apparatus, for example a helmet display, to blend the real image of the real scene and the virtual image generated by the micro-display together, so as to be capable of viewing the scene after the virtual image is blended into the real scene.

Figure 1:
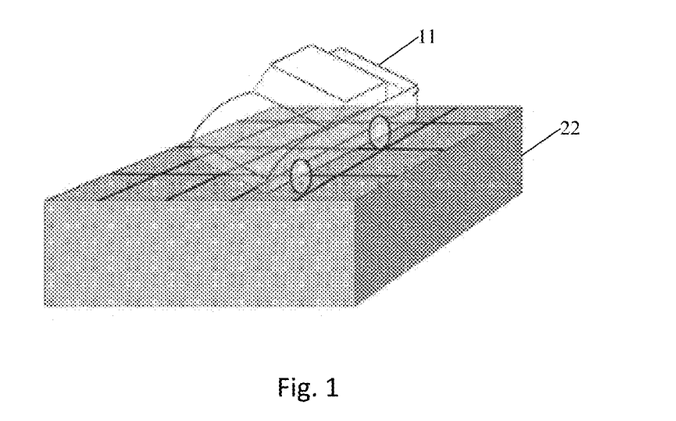
FIG. 1 is a schematic view of an image after combining a virtual image and a real image in the related art.

For example, the helmet display provided by the related art may combine the virtual image and the real image together. However, take the image shown in FIG. 1 as an example, the virtual car image 11 generated by the helmet display cannot shield the real platform image 22 of the real scene. This makes it difficult to distinguish the depth relationship between the car and the platform, which influences the display effect of the virtual car image 11, thereby influencing the effect of integrating the virtual car image 11 into the real platform image 22. Therefore, how to intuitively display the shielding relationship between the virtual image and the real image so as to enable the virtual image to be blended into the real image better has become a problem that needs to be solved urgently.

SUMMARY

In order to solve or mitigate at least one of the defects as stated above, this disclosure provides an augmented reality display apparatus and an augmented reality display method, which may display the shielding relationship between a virtual image and a real image intuitively, so as to enable the virtual image to be blended into the real image better.

A first aspect according to this disclosure provides an augmented reality display apparatus, comprising:

a virtual image data extractor, configured to extract virtual image data of a virtual image;

a real image data extractor, configured to extract real image data of a real image; and an image controller connected with the virtual image data extractor and the real image data extractor respectively, the image controller being configured to, based on the extracted virtual image data and the extracted real image data, determine coincide data of the virtual image data and the real image data, and obtain visual object information of the coincide data, wherein the visual object information includes at least one visual object and corresponding visual object position data, and the visual object and a non-visual object shielded by it are located within the coincide data.

The image controller may be further configured to, based on the visual object information, control a content corresponding to the visual object to be in a display state, and control a content corresponding to the non-visual object to be in a non-display state. For example, when the virtual image is in the front, the visual object is the virtual image, its corresponding content is in the display state, the non-visual object is the real image, its corresponding content is in the non-display state; or when the real image is in the front, the visual object is the real image, its corresponding content is in the display state, the non-visual object is the virtual image, its corresponding content is in the non-display state.

In one specific implementation, the image controller may be configured for receiving the visual object information of the coincide data from a user. Or alternatively, the image controller may be configured to determine the visual object information of the coincide data by itself.

In the augmented reality display apparatus provided by some embodiments of this disclosure, the image controller may determine the coincide data of the virtual image data and the real image data based on the extracted virtual image data and the extracted real image data, and control the content corresponding to the visual object to be in the display state and control the content corresponding to the non-visual object to be in the non-display state based on the obtained visual object information. In this way, when a certain visual object is a virtual image, and the non-visual object shielded by it is a real image, the image controller may control the content of a portion in the virtual image corresponding to the visual object to be in the display state, and control the content of a portion in the real image corresponding to the non-visual object to be in the non-display state, i.e., makes the user unable to see the portion in the real image that is shielded by the virtual image. When a certain visual object is a real image, and the non-visual object corresponding to it is a virtual image, the image controller may control the content of a portion in the real image corresponding to the visual object to be in the display state, and control the content of a portion in the virtual image corresponding to the non-visual object to be in the non-display state, i.e., makes the user unable to see the portion in the virtual image that is shielded by the real image. Therefore, the augmented reality display apparatus may reflect the shielding relationship between the real image and the virtual image intuitively so as to blend the virtual image into the real image better.

In one embodiment, the augmented reality display apparatus further comprises: a first polarizing device, configured to convert light of the virtual image into polarized light; and a second polarizing device, configured to convert light of the real image into polarized light. The image controller comprises a light modulator and a third polarizing device. The light modulator is connected with the virtual image data extractor and the real image data extractor respectively. The light modulator is configured to, based on the extracted virtual image data and the extracted real image data, determine coincide data of the virtual image data and the real image data, and obtain visual object information of the coincide data, based on which a polarization state of polarized light corresponding to contents of the virtual image and the real image located within the coincide data is modulated, so as to enable the polarized light corresponding to contents in the virtual image and the real image serving for the visual object to be transmitted from the third polarizing device. The third polarizing device shields polarized light corresponding to contents in the virtual image and the real image serving for the non-visual object.

In one embodiment, the first polarizing device comprises a first polarizer, which is configured to convert light of the virtual image into linearly polarized light. The second polarizing device comprises a second polarizer, which is configured to convert light of the real image into linearly polarized light. A polarizing axis direction of the first polarizer is perpendicular to a polarizing axis direction of the second polarizer. The third polarizing device comprises a third polarizer, a polarizing axis direction of the third polarizer being perpendicular to the polarizing axis direction of the first polarizer. The image controller further comprises a beam splitter, the beam splitter being configured to transmit the linearly polarized light of the virtual image and the linearly polarized light of the real image to the light modulator. The light modulator comprises a spatial light modulator, an angle formed between an optical axis direction of liquid crystals in the spatial light modulator in an non-energized state and the polarizing axis direction of the first polarizer being +45°, an angle formed between the optical axis direction of liquid crystals in the spatial light modulator in the non-energized state and the polarizing axis direction of the second polarizer being −45°.

In one embodiment, the first polarizing device comprises a first polarizer and a first phase retarder of λ/4 wavelength, and is configured to convert light of the virtual image into circularly polarized light. The second polarizing device comprises a second polarizer and a second phase retarder of λ/4 wavelength, and is configured to convert light of the real image into circularly polarized light. The third polarizing device comprises a third phase retarder of λ/4 wavelength and a third polarizer. An angle formed by a polarizing axis direction of the first polarizer and an optical axis direction of the first phase retarder is a first angle, an angle formed by a polarizing axis direction of the second polarizer and an optical axis direction of the second phase retarder is a second angle, an angle formed by a polarizing axis direction of the third polarizer and an optical axis direction of the third phase retarder is a third angle, the first angle, the second angle and the third angle being 45° or 135° respectively.

In one embodiment, the first angle, the second angle and the third angle have an equal degree. The image controller further comprises a beam splitter, the beam splitter being configured to transmit the circularly polarized light of the virtual image to the light modulator, the beam splitter being further configured to change a rotation direction of the circularly polarized light of the real image, and transmit the circularly polarized light of the real image whose rotation direction has been changed to the light modulator.

In one embodiment, the augmented reality display apparatus further comprises a virtual image generator. The first polarizing device is arranged at a light exit surface of the virtual image generator. The virtual image generator is connected with the virtual image data extractor. The virtual image data extractor is configured to extract virtual image data based on a virtual image generated by the virtual image generator.

In one embodiment, the virtual image generator is a liquid crystal display, a plasma display or an organic light emitting diode display.

In one embodiment, the augmented reality display apparatus further comprises a real light transmitter. The second polarizing device and the real image data extractor are arranged successively at a light exit side of the real light transmitter.

In one embodiment, the real light transmitter comprises a first reflecting device, an objective lens and a second reflecting device. The first reflecting device is configured to reflect light of a real scene to the objective lens, and the second reflecting device is configured to reflect light of a real image that is imaged and amplified by the objective lens to the second polarizing device.

In one embodiment, the augmented reality display apparatus further comprises an eyepiece and a third reflecting device. The eyepiece is configured to amplify a combined image formed by combining the virtual image and the real image, and the third reflecting device is configured to transmit light of the amplified combined image into human eyes.

In one embodiment, the real image data extractor comprises a spatial light modulator.

A second aspect according to this disclosure provides an augmented reality display method. The augmented reality display method comprises:

extracting virtual image data of a virtual image;
extracting real image data of a real image;
determining coincide data of the virtual image data and the real image data based on the extracted virtual image data and the extracted real image data; obtaining visual object information of the coincide data; wherein the visual object information includes at least one visual object and corresponding visual object position data, the visual object and a non-visual object shield by it are located within the coincide data;
controlling a content corresponding to the visual object to be in a display state and controlling a content corresponding to the non-visual object to be in a non-display state based on the visual object information. For example, when the virtual image is in the front, the visual object is the virtual image, its corresponding content is in the display state, the non-visual object is the real image, its corresponding content is in the non-display state; or when the real image is in the front, the visual object is the real image, its corresponding content is in the display state, the non-visual object is the virtual image, its corresponding content is in the non-display state.

In one specific implementation, the visual object information of the coincide data may be received from a user. Or alternatively, the visual object information of the coincide data may be determined locally.

In one embodiment, the augmented reality display method further comprises: converting light of the virtual image into polarized light, converting light of the real image into polarized light. The step of to controlling a content corresponding to the visual object to be in a display state and controlling a content corresponding to the non-visual object to be in a non-display state based on the visual object information comprises: modulating a polarization state of polarized light corresponding to contents of the virtual image and the real image located within the coincide data based on the visual object information, so as to enable the polarized light corresponding to contents in the virtual image and the real image serving for the visual object to be transmitted from the third polarizing device, and the polarized light corresponding to contents in the virtual image and the real image serving for the non-visual object to be shielded.

In one embodiment, the step of converting light of the virtual image into polarized light comprises: converting the light of the virtual image into linearly polarized light; the step of converting light of the real image into polarized light comprises: converting the light of the real image into linearly polarized light. Or alternatively, the step of converting light of the virtual image into polarized light comprises: converting the light of the virtual image into circularly polarized light; the step of converting light of the real image into polarized light comprises: converting the light of the real image into circularly polarized light.

In one embodiment, the augmented reality display method further comprises: generating a virtual image before extracting virtual image data of the virtual image. The step of extracting virtual image data of the virtual image comprises: extracting the virtual image data of the virtual image based on the generated virtual image.

The beneficial effect of the augmented reality display method provided by some embodiments of this disclosure is same as that of the augmented reality display apparatus provided by the first aspect of this disclosure, which will not be repeated herein.

This summary introduces some concepts of the present disclosure in a simplified form. These concepts will be described further in the following embodiments. This summary is not intended to identify essential features or substantive features of the claimed subject matters, nor is it intended to limit the scopes of the claimed subject matters. In addition, just as described herein, various other features and advantages may also be combined into these technologies as needed.

BRIEF DESCRIPTION OF THE DRAWINGS

In order to explain the related art and the technical solutions of some embodiments of this disclosure more clearly, this disclosure provides the following drawings for use in describing the related art and embodiments. It should be aware that the drawings described below only involve some embodiments, skilled in the art, other drawings can also be obtained from these drawings on the premise of not paying any inventive efforts for the ordinary skilled in the art. The other drawings also fall within the scope of the present disclosure.

DETAILED DESCRIPTION

In order to understand the purposes, technical solutions and advantages of some embodiments more clearly, these embodiments will be further described in detail in conjunction with the drawings and the specific implementations below. The ordinary skilled in the art can understand that the embodiments described are merely a part of rather than all of the embodiments of the present disclosure. Based on the embodiments described in this disclosure, the ordinary skilled in the art can obtain other embodiments on the premise of not paying any inventive efforts. All other embodiments obtained belong to the protection scope of the present disclosure.

Figure 2:
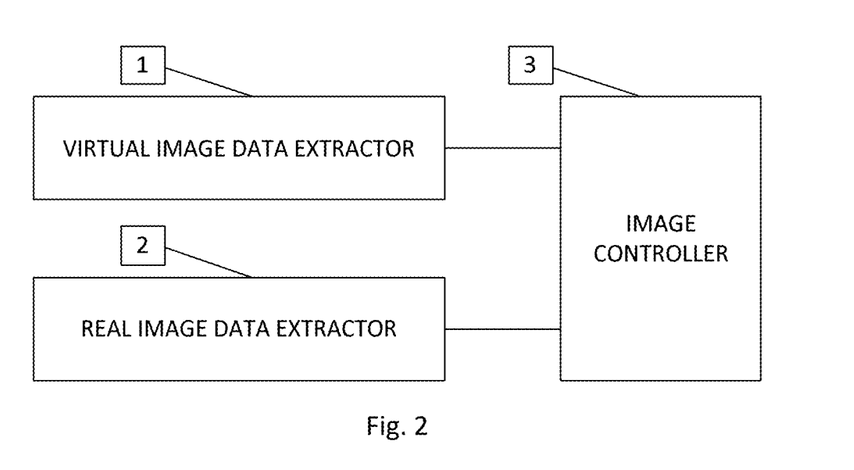
FIG. 2 is a structural schematic view of an augmented reality display apparatus provided by an embodiment of this disclosure.

FIG. 2 shows a structural schematic view of an augmented reality display apparatus provided by an embodiment of this disclosure. As shown in FIG. 2, the augmented reality display apparatus may comprise a virtual image data extractor 1, a real image data extractor 2, and an image controller 3 connected with the virtual image data extractor 1 and the real image data extractor 2 respectively.

The virtual image data extractor 1 may be configured for extracting virtual image data of the virtual image. The real image data extractor 2 may be configured for extracting real image data of the real image. The image controller 3 may be configured to, based on the extracted virtual image data and the extracted real image data, determine coincide data of the virtual image data and the real image data, and obtain visual object information of the coincide data. In one embodiment, the image controller 3 may receive visual object information of the coincide data transmitted by a user. Or alternatively, the image controller 3 may be configured to determine the visual object information of the coincide data by itself. The visual object information may include at least one visual object and corresponding visual object position data. The visual object and a non-visual object shielded by it are located within the coincide data.

The image controller 3 may be further configured to, based on the visual object information, control a content corresponding to the visual object to be in a display state, and control a content corresponding to the non-visual object to be in a non-display state. For example, when the virtual image is in the front, the visual object is the virtual image, its corresponding content is in the display state, the non-visual object is the real image, its corresponding content is in the non-display state image as it is shielded by the virtual image; or when the real image is in the front, the visual object is the real image, its corresponding content is in the display state, the non-visual object is the virtual image, its corresponding content is in the non-display state as it is shielded by the real image.

Figure 3A:
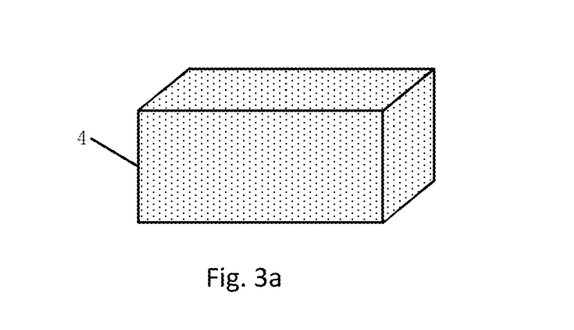
FIG. 3a is a schematic view of a virtual image provided by an embodiment of this disclosure.
Figure 3B:
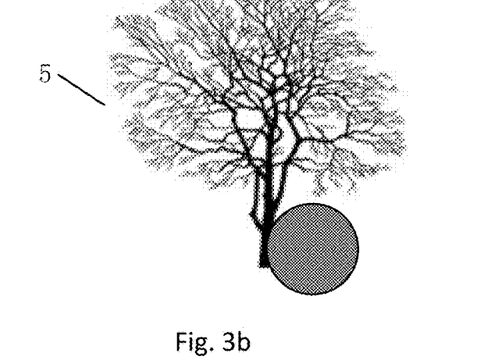
FIG. 3b is a schematic view of a real image provided by an embodiment of this disclosure.
Figure 3C:
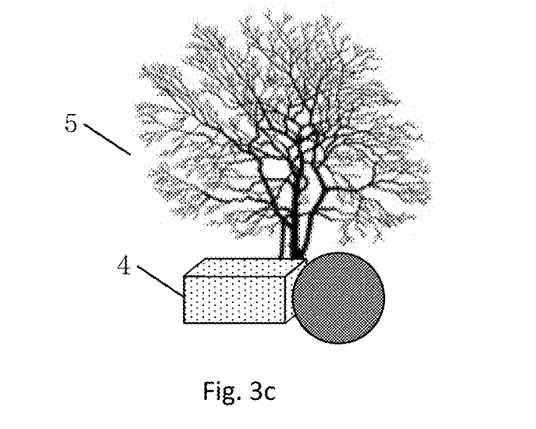
FIG. 3c is a schematic view of an image after combining the virtual image and the real image provided by an embodiment of this disclosure.
Figure 3D:
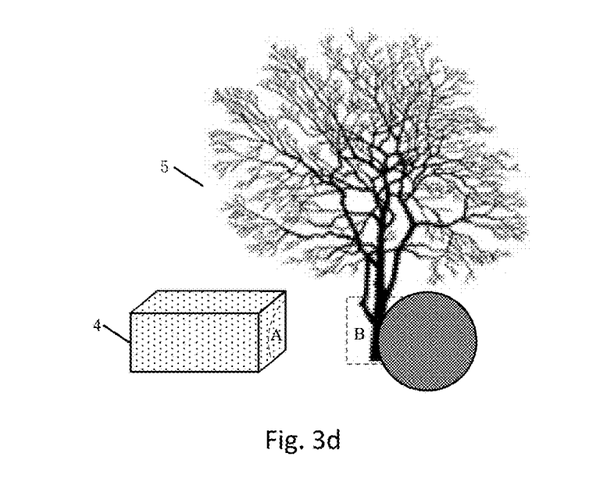
FIG. 3d is a schematic view of another image after combining the virtual image and the real image provided by an embodiment of this disclosure.

In order to describe the visual object and the non-visual object more clearly, next, the visual object will be explained in detail in conjunction with FIGS. 3a-3d. FIG. 3a shows a schematic view of a virtual image provided by an embodiment of this disclosure. FIG. 3b shows a schematic view of a real image provided by an embodiment of this disclosure. FIG. 3c shows a schematic view of an image after combining the virtual image and the real image provided by an embodiment of this disclosure. FIG. 3d shows a schematic view another image after combining the virtual image and the real image provided by an embodiment of this disclosure.

As shown in the figures, the image as shown in FIG. 3a is a virtual image 4, the image as shown in FIG. 3b is a real image 5, the image as shown in FIG. 3c is a combined image after combining the virtual image 4 and the real image 5. From the combined image as shown in FIG. 3c it can be seen that the image areas corresponding to the coincide data of the virtual image data and the real image data are area A and area B. In order to show the two areas more clearly, FIG. 3d shows the area A and the area B respectively in a manner of separating the virtual image and the real image from each other.

From FIG. 3c and FIG. 3d it can be seen that the visual object information of the coincide data includes two visual objects, i.e., the visual object corresponding to area A and the visual object corresponding to area B. From FIG. 3c it may be seen that for the image corresponding to area A, the real image 5 shields the virtual image 4, i.e., the visual object corresponding to area A is the real image 5, the non-visual object is the virtual image 4. For the image corresponding to area B, the virtual image 4 shield the real image 5, i.e., the visual object corresponding to area B is the virtual image 4, the non-visual object is the real image 5.

Combined with the above description, in the augmented reality display apparatus provided by the above embodiment, the image controller 3 can, based on the extracted virtual image data and the extracted real image data, determine the coincide data of the virtual image data and the real image data and obtain visual object information of the coincide data, and based on the obtained visual object information, control the content corresponding to the visual object to be in the display state and control the content corresponding to the non-visual object to be in the non-display state. In this way, when a certain visual object is a virtual image, and the non-visual object corresponding to it is a real image, the image controller 3 may control the content of a portion in the virtual image corresponding to the visual object to be in the display state, and control the content of a portion in the real image corresponding to the non-visual object to be in the non-display state, i.e., making the user unable to see the portion in the real image that is shielded by the virtual image. When a certain visual object is a real image, and the non-visual object corresponding to it is a virtual image, the image controller 3 may control the content of a portion in the real image corresponding to the visual object to be in the display state, and control the content of a portion in the virtual image corresponding to the non-visual object to be in the non-display state, i.e., making the user unable to see the portion in the virtual image that is shielded by the real image. Therefore, the augmented reality display apparatus provided by this embodiment may reflect the shielding relationship between the real image and the virtual image intuitively, so as to blend the virtual image into the real image better.

It should be noted that the above visual object and the non-visual object shielded by it are located within coincide data means that the positions corresponding to the visual object and the non-visual object are located within the coincide area that exists after the virtual image and the real image are combined.

Figure 4:
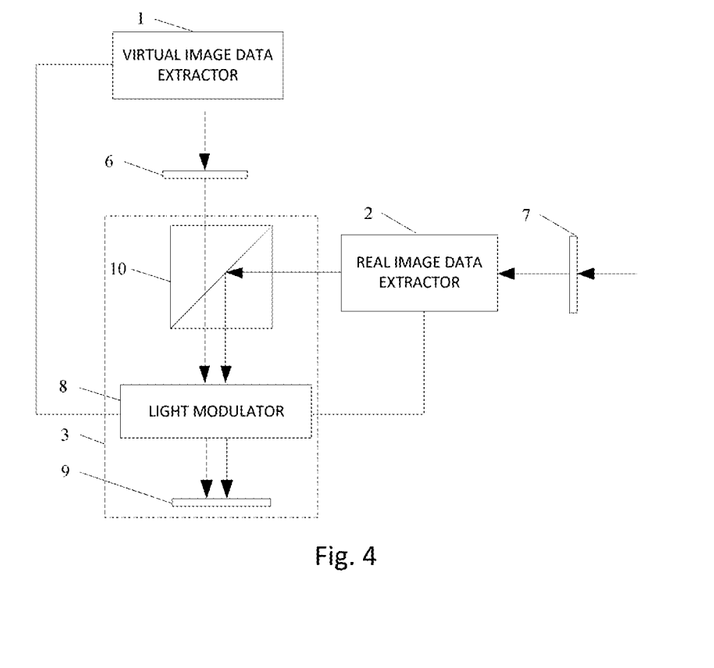
FIG. 4 is another structural schematic view of an augmented reality display apparatus provided by an embodiment of this disclosure.

FIG. 4 shows another structural schematic view of an augmented reality display apparatus provided by an embodiment of this disclosure. As shown in FIG. 4, the augmented reality display apparatus may further comprise a first polarizing device 6 and a second polarizing device 7. The first polarizing device 6 may be configured to convert light of the virtual image into polarized light, and the second polarizing device 7 may be configured to convert light of the real image into polarized light.

In one embodiment, the real image data extractor 2 is located at a light exit side of the second polarizing device 7. The real image data extracted by the real image data extractor 2 is the real image data of the real image formed after the light of the real scene is converted into polarized light via the second polarizing device 7.

Correspondingly, the image controller 3 may comprise a light modulator 8 and a third polarizing device 9. The light modulator 8 is connected with the virtual image data extractor 1 and the real image data extractor 2 respectively. The light modulator 8 may be configured to, based on the extracted virtual image data and the extracted real image data, determine the coincide data of the virtual image data and the real image data, and obtain the visual object information of the coincide data; and based on the visual object information, modulate the polarization state of the polarized light corresponding to the content of the virtual image and the real image located in the coincide data, so that the polarized light corresponding to the content as the visual objects in the virtual image and the real image is transmitted from the third polarizing device 9. The third polarizing device 9 shields the polarized light corresponding to the content as the non-visual objects in the virtual image and the real image. In one embodiment, the light modulator 8 may receive the visual object information of the coincide data transmitted by the user. Or alternatively, the light modulator 8 may be configured to determine the visual object information of the coincide data by itself.

It could be understood that in order to transmit the polarized light of the virtual image converted via the first polarizing device 6 and the polarized light of the real image converted via the second polarizing device 7 to the light modulator 8, the image controller 3 may further comprise a beam splitter 10. The beam splitter 10 is arranged between the first polarizing device 6 and the light modulator 8, and between the second polarizing device 7 and the light modulator 8.

Because the polarized light includes both linearly polarized light and circularly polarized light, on the basis of this, the structures of the first polarizing device 6, the second polarizing device 7 and the third polarizing device 9 correspond to two cases respectively: linearly polarized light and circularly polarized light. They will be explained below respectively.

When the polarized light which is resulted from the light of the virtual image converted via the first polarizing device 6 is linearly polarized light, and the polarized light which is resulted from the light of the real image converted via the second polarizing device 7 is linearly polarized light, the first polarizing device 6 may comprise a first polarizer, the second polarizing device 7 may comprise a second polarizer, and the third polarizing device 9 may comprise a third polarizer. The polarizing axis direction of the first polarizer may be perpendicular to the polarizing axis direction of the second polarizer, and the polarizing axis direction of the third polarizer may be perpendicular to the polarizing axis direction of the first polarizer.

Correspondingly, the light modulator 8 may comprise a spatial light modulation. The spatial light modulator may comprise an upper glass substrate and a lower glass substrate arranged oppositely. A common electrode may be arranged on a surface of the upper glass substrate facing towards the lower glass substrate, pixel electrodes may be arranged on a surface of the lower glass substrate facing towards the upper glass substrate, and liquid crystals may be arranged between the common electrode and the pixel electrodes.

Figure 5:
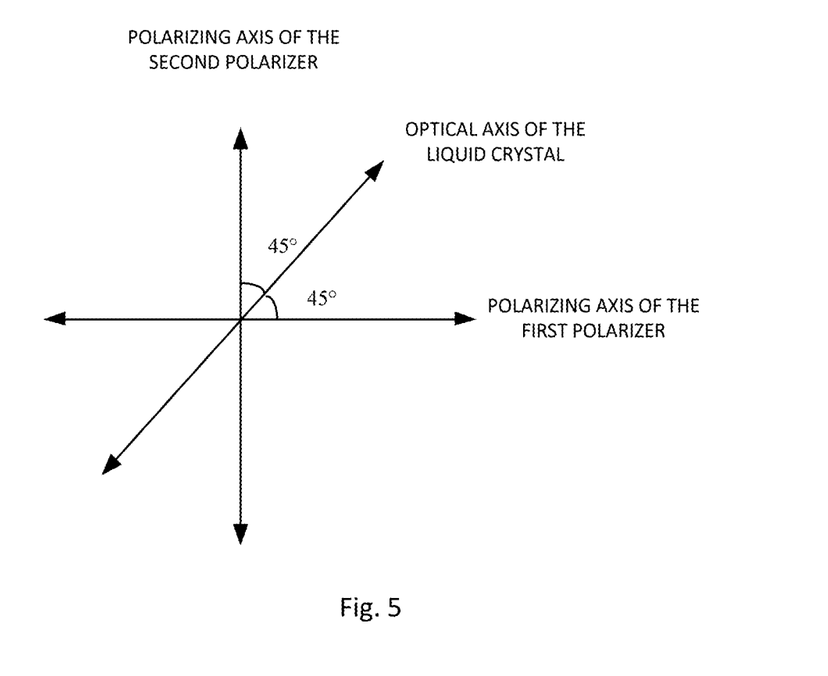
FIG. 5 is a schematic view of directions of an optical axis of liquid crystals, a polarizing axis of a first polarizer, a polarizing axis of a second polarizer provided by an embodiment of this disclosure.

FIG. 5 shows a schematic view of directions of an optical axis of the liquid crystals, a polarizing axis of the first polarizer, a polarizing axis of the second polarizer provided by an embodiment of this disclosure. As shown in FIG. 5, an angle formed between an optical axis direction of liquid crystals in the spatial light modulator in an non-energized state and the polarizing axis direction of the first polarizer is +45°, and an angle formed between the optical axis direction of liquid crystals in the spatial light modulator in the non-energized state and the polarizing axis direction of the second polarizer is −45°.

Figure 6A:
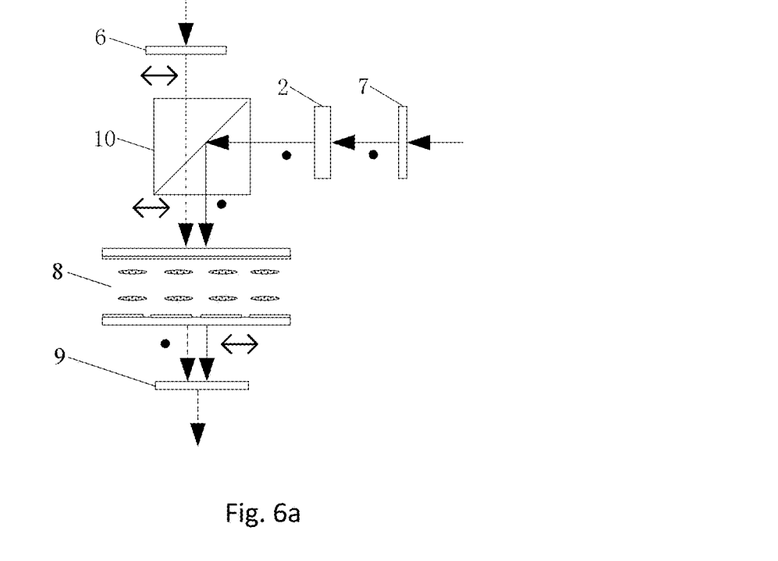
FIG. 6a is a schematic view of light propagation of an augmented reality display apparatus provided by an embodiment of this disclosure.
Figure 6B:
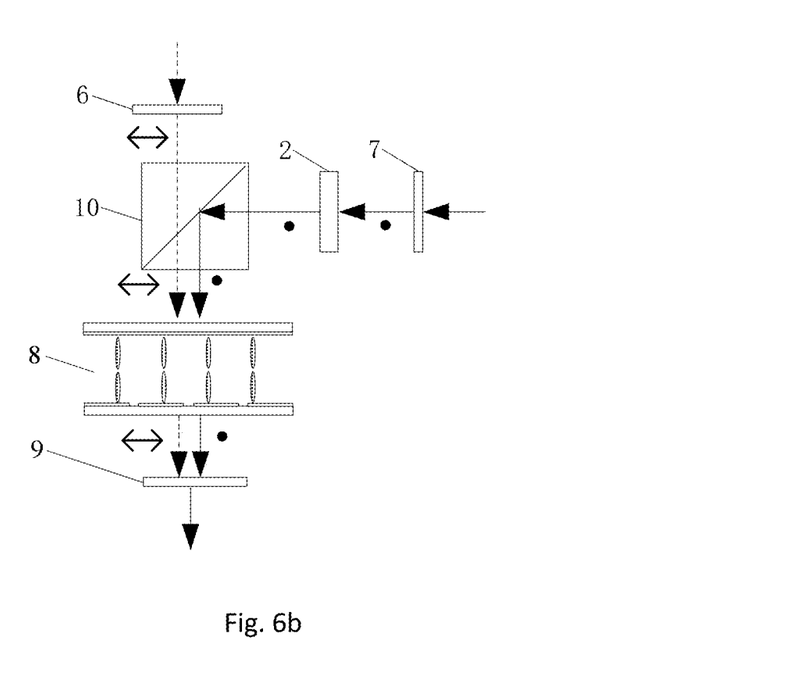
FIG. 6b is another schematic view of light propagation of an augmented reality display apparatus provided by an embodiment of this disclosure.

FIGS. 6a and 6b respectively show two light propagation schematic views of the augmented reality display apparatus provided by an embodiment of this disclosure. Referring to FIG. 6a and FIG. 6b, by way of example, given that the visual object information of the coincide data only includes one visual object, and the polarizing axis direction of the first polarizer is parallel to the plane of the drawing, the polarizing axis direction of the second polarizer is perpendicular to the plane of the drawing, and the polarizing axis direction of the third polarizer is perpendicular to the plane of the drawing, the light modulation principles of the first polarizer, the second polarizer, the spatial light modulator and the third polarizer will be explained specifically.

The light of the virtual image is incident to the first polarizer, and is converted into linearly polarized light via the first polarizer, of which polarizing direction is parallel to the plane of the drawing. The light of the real image is incident to the second polarizer, and is converted into linearly polarized light via the second polarizer, of which polarizing direction is perpendicular to the plane of the drawing.

The linearly polarized light of the virtual image is transmitted to the spatial light modulator via the beam splitter 10, meanwhile, the linearly polarized light of the real image is reflected to the spatial light modulator via the beam splitter 10. It should be noted that the polarizing direction of the linearly polarized light does not change after the linearly polarized light being transmitted and reflected via the beam splitter 10. Hence, the polarizing direction of the linearly polarized light of the virtual image transmitted to the spatial light modulator via the beam splitter 10 is still parallel to the plane of the drawing, and the polarizing direction of the linearly polarized light of the real image transmitted to the spatial light modulator via the beam splitter 10 is still perpendicular to the plane of the drawing.

The spatial light modulator, after receiving the linearly polarized light of the virtual image and the linearly polarized light of the real image, may modulate the polarization state of the linearly polarized light corresponding to the content of the virtual image and the real image located in the coincide data based on the visual object information of the coincide data.

As shown in FIG. 6a, when the liquid crystal in the spatial light modulator corresponding to the position of the visual object or the non-visual object of the coincide data is non-energized, the non-energized liquid crystal is in a horizontal state, because the angle formed between the optical axis direction of the liquid crystal and the polarizing axis direction of the first polarizer is +45°, and the angle formed between the optical axis direction of the liquid crystal and the polarizing axis direction of the second polarizer is −45°, after the linearly polarized light corresponding to the content of the virtual image located in the coincide data is reflected by the liquid crystal, the polarizing direction is changed to be perpendicular to the plane of the drawing. In the meantime, after the linearly polarized light corresponding to the content of the real image located in coincide data is reflected by the liquid crystal, its polarizing direction is changed to be parallel to the plane of the drawing.

When the linearly polarized light that is modulated by the spatial light modulator and corresponds to the contents in the virtual image and the real image located in the coincide data is incident to the third polarizer, because the polarizing direction of the linearly polarized light of the virtual image is parallel to the polarizing axis direction of the third polarizer, at this point, the linearly polarized light corresponding to the content of the virtual image located in the coincide data may be fully transmitted by the third polarizer. Whereas because the polarizing direction of the linearly polarized light of the real image is perpendicular to the polarizing axis direction of the third polarizer, at this point, the linearly polarized light of the real image cannot be transmitted from the third polarizer. In such a case, the visual object is the virtual image, and the non-visual object is the real image, i.e., presenting the effect that the virtual image shields the real image.

As shown in FIG. 6b, when the liquid crystal in the spatial light modulator corresponding to the position of the visual object or the non-visual object of the coincide data is energized, the energized liquid crystal will be reversed from the horizontal state to the vertical state. At this point, after the linearly polarized light corresponding to the content of the virtual image located in the coincide data and the linearly polarized light corresponding to the content of the real image located in the coincide data pass through the liquid crystal, their respective polarizing directions will not change. At this point, the polarizing direction of the linearly polarized light corresponding to the content of the virtual image located in the coincide data is still parallel to the plane of the drawing, and the polarizing direction of the linearly polarized light corresponding to the content of the real image located in the coincide data is still perpendicular to the plane of the drawing.

When the linearly polarized light that is modulated by the spatial light modulator and corresponds to the contents in the virtual image and the real image located in the coincide data is incident to the third polarizer, because the polarizing direction of the linearly polarized light of the virtual image is perpendicular to the polarizing axis direction of the third polarizer, at this point, the linearly polarized light corresponding to the content of the virtual image located in the coincide data cannot be transmitted by the third polarizer. Whereas because the polarizing direction of the linearly polarized light of the real image is parallel to the polarizing axis direction of the third polarizer, at this point, the linearly polarized light of the real image may be fully transmitted by the third polarizer. In such a case, the visual object is the real image, and the non-visual object is the virtual image, i.e., presenting the effect that the real image shields the virtual image.

It shall be noted that when the polarizing axis direction of the first polarizer is parallel to the plane of the drawing, and the polarizing axis direction of the second polarizer is perpendicular to the plane of the drawing, the polarizing axis direction of the third polarizer may also be parallel to the plane of the drawing, in such a case, as long as the liquid crystals of the portion in the spatial light modulator corresponding to the coincide data are energized, it may be realized that the visual object is the virtual image and the non-visual object is the real image, i.e., presenting the effect that the virtual image shields the real image. As long as the liquid crystals of the spatial light modulator are not energized, it may be realized that the visual object is the real image and the non-visual object is the virtual image, i.e., presenting the effect that the real image shields the virtual image.

For the same reason, the polarizing axis direction of the first polarizer may also be perpendicular to the plane of the drawing, meanwhile, the polarizing axis direction of the second polarizer may also be parallel to the plane of the drawing. In such a case, the polarizing axis direction of the third polarizer may be either perpendicular to the plane of the drawing or parallel to the plane of the drawing, and the light modulation principle is same as the above principle, which will not be repeated herein.

It shall be noted that the liquid crystals in the spatial light modulator may also be liquid crystals in the TN mode. The deflection state of the liquid crystals in the TN mode may be controlled by applying voltages to the liquid crystals in the TN mode, so as to achieve modulation of the polarization state of the linearly polarized light.

Figure 7:
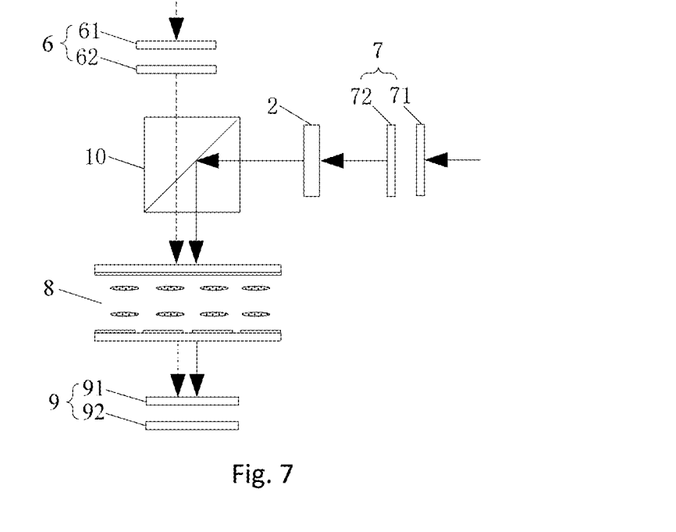
FIG. 7 is another structural schematic view of an augmented reality display apparatus provided by an embodiment of this disclosure.

FIG. 7 shows another structural schematic view of an augmented reality display apparatus provided by an embodiment of this disclosure. As shown in FIG. 7, when the polarized light of the light of the virtual image converted via the first polarizing device 6 is circularly polarized light and the polarized light of the light of the real image converted via the second polarizing device 7 is also circularly polarized light, the first polarizing device 6 may comprise a first polarizer 61 and a first phase retarder 62 of λ/4 wavelength, the second polarizing device 7 may comprise a second polarizer 71 and a second phase retarder 72 of λ/4 wavelength, and the third polarizing device 9 may comprise a third phase retarder 91 of λ/4 wavelength and a third polarizer 92. Correspondingly, the light modulator 8 may comprise a spatial light modulator.

The angle formed by the polarizing axis direction of the first polarizer 61 and the optical axis direction of the first phase retarder 62 may be called a first angle, the angle formed by the polarizing axis direction of the second polarizer 71 and the optical axis direction of the second phase retarder 72 may be called a second angle, and the angle formed by the polarizing axis direction of the third polarizer 92 and the optical axis direction of the third phase retarder 91 may be called a third angle. The first angle, the second angle and the third angle may be 45° or 135° respectively.

Figure 8A:
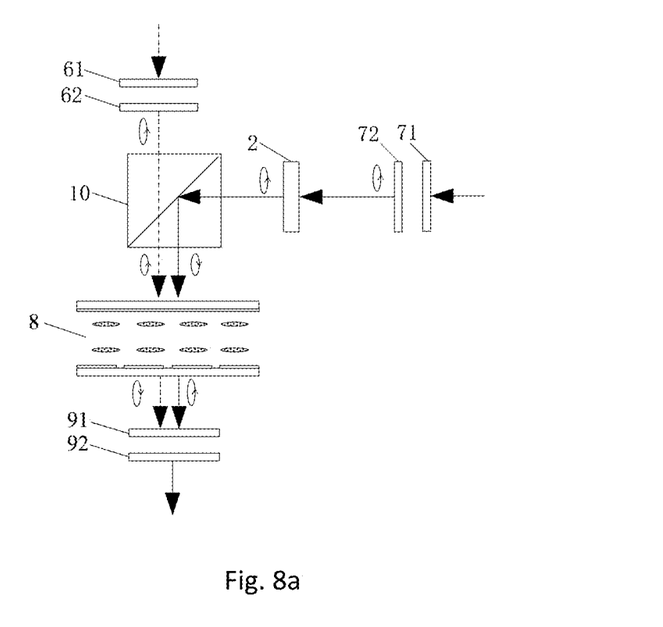
FIG. 8a is another schematic view of light propagation of an augmented reality display apparatus provided by an embodiment of this disclosure.
Figure 8B:
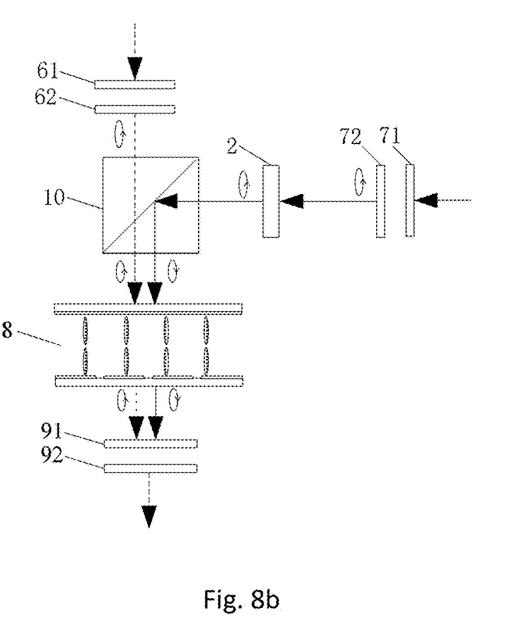
FIG. 8b is another schematic view of light propagation of an augmented reality display apparatus provided by an embodiment of this disclosure.

FIG. 8a and FIG. 8b respectively show two light propagation schematic views of an augmented reality display apparatus provided by an embodiment of this disclosure. Referring to FIG. 8a and FIG. 8b, next, by taking the example that the visual object information of the coincide data only includes one visual object and the first angle, the second angle and the third angle are respectively 45°, the working principles of the first polarizing device 6, the second polarizing device 7, the spatial light modulator and the third polarizing device 9 will be explained specifically.

Because the first angle formed by the polarizing axis direction of the first polarizer 61 and the optical axis direction of the first phase retarder 62 is 45°, the light of the virtual image, after being transmitted to the first phase retarder 62 via the first polarizer 61, is converted into left-handed circularly polarized light by the first phase retarder 62. Because the second angle formed by the polarizing axis direction of the second polarizer 71 and the optical axis direction of the second phase retarder 72 is also 45°, the light of the real image is transmitted to the second phase retarder 72 via the second polarizer 71, and is also converted into left-handed circularly polarized light by the second phase retarder 72.

The left-handed circularly polarized light of the virtual image is transmitted onto the spatial light modulator via the beam splitter 10, meanwhile, the left-handed circularly polarized light of the real image is reflected to the spatial light modulator. It shall be noted that after the circularly polarized light is transmitted by the beam splitter 10, its rotation direction does not change, while after the circularly polarized light is reflected by the beam splitter 10, its rotation direction will be reversed. Hence, the rotation direction of the circularly polarized light of the virtual image transmitted to the spatial light modulator via the beam splitter 10 is still left-handed, and the rotation direction of the circularly polarized light of the real image transmitted to the spatial light modulator via the beam splitter 10 is converted to be right-handed.

The spatial light modulator, after receiving the left-handed circularly polarized light of the virtual image and the right-handed circularly polarized light of the real image, based on the visual object information of the coincide data, modulates the polarization state of the circularly polarized light corresponding to the content of the virtual image and the real image located in the coincide data.

As shown in FIG. 8a, when the liquid crystals of the spatial light modulator are not energized, the liquid crystals are in the horizontal state, hence, when the left-handed circularly polarized light corresponding to the content of the virtual image located in the coincide data is reflected by the liquid crystals, its rotation direction will be converted to be right-handed. In the meantime, when the right-handed circularly polarized light corresponding to the content of the real image located in the coincide data is reflected by the liquid crystals, its rotation direction will be converted to be left-handed.

When the circularly polarized light that is modulated by the spatial light modulator and corresponds to the content of the virtual image and the real image located in the coincide data is transmitted to the third polarizer 92 via the third phase retarder 91, because the third angle formed by the polarizing axis direction of the third polarizer 92 and the optical axis direction of the third phase retarder 91 is 45°, the polarizing direction of the linearly polarized light of the virtual image converted by the third phase retarder 91 is perpendicular to the polarizing axis direction of the third polarizer 92, and the polarizing direction of the linearly polarized light of the real image converted by the third phase retarder 91 is parallel to the polarizing axis direction of the third polarizer 92, at this point, the linearly polarized light corresponding to the content of the virtual image located in the coincide data cannot be transmitted by the third polarizer 92, and the linearly polarized light of the real image may be fully transmitted by the third polarizer 92. In such a case, the visual object is the real image and the non-visual object is the virtual image, i.e., presenting the effect that the real image shields the virtual image.

As shown in FIG. 8b, when the liquid crystals in the spatial light modulator corresponding to the position of the visual object of the coincide data are energized, the liquid crystals will be reversed from the horizontal state to the vertical state, at this point, when the circularly polarized light corresponding to the content of the virtual image and the real image located in the coincide data passes through the liquid crystals, the respective rotation directions will be not changed. At this point, the rotation direction of the circularly polarized light corresponding to the content of the virtual image located in the coincide data is still left-handed circularly polarized light, and the rotation direction of the circularly polarized light corresponding to the content of the real image located in the coincide data is still right-handed circularly polarized light.

When the circularly polarized light that is modulated by the spatial light modulator and corresponds to the content of the virtual image and the real image located in the coincide data is transmitted to the third polarizer 92 via the third phase retarder 91, because the third angle formed by the polarizing axis direction of the third polarizer 92 and the optical axis direction of the third phase retarder 91 is 45°, the polarizing direction of the linearly polarized light of the virtual image converted by the third phase retarder 91 is parallel to the polarizing axis direction of the third polarizer 92, and the polarizing direction of the linearly polarized light of the real image converted by the third phase retarder 91 is perpendicular to the polarizing axis direction of the third polarizer 92, at this point, the linearly polarized light corresponding to the content of the virtual image located in the coincide data may be fully transmitted by the third polarizer 92, and the linearly polarized light of the real image cannot be transmitted by the third polarizer 92. In such a case, the visual object is the virtual image and the non-visual object is the real image, i.e., presenting the effect that the virtual image shields the real image.

It shall be noted that the first angle, the second angle and the third angle may also be 145° respectively, at this point, the light of the virtual image, after passing through the first polarizer 61 and the first phase retarder 62 successively, will be converted into right-handed circularly polarized light. Similarly, the light of the real image, after passing through the second polarizer 71 and the second phase retarder 72 successively, will also be converted into right-handed circularly polarized light. The principle of subsequent modulation of the circularly polarized light by the spatial light modulator is same as the above modulation principle, which will not be repeated herein.

Figure 9:
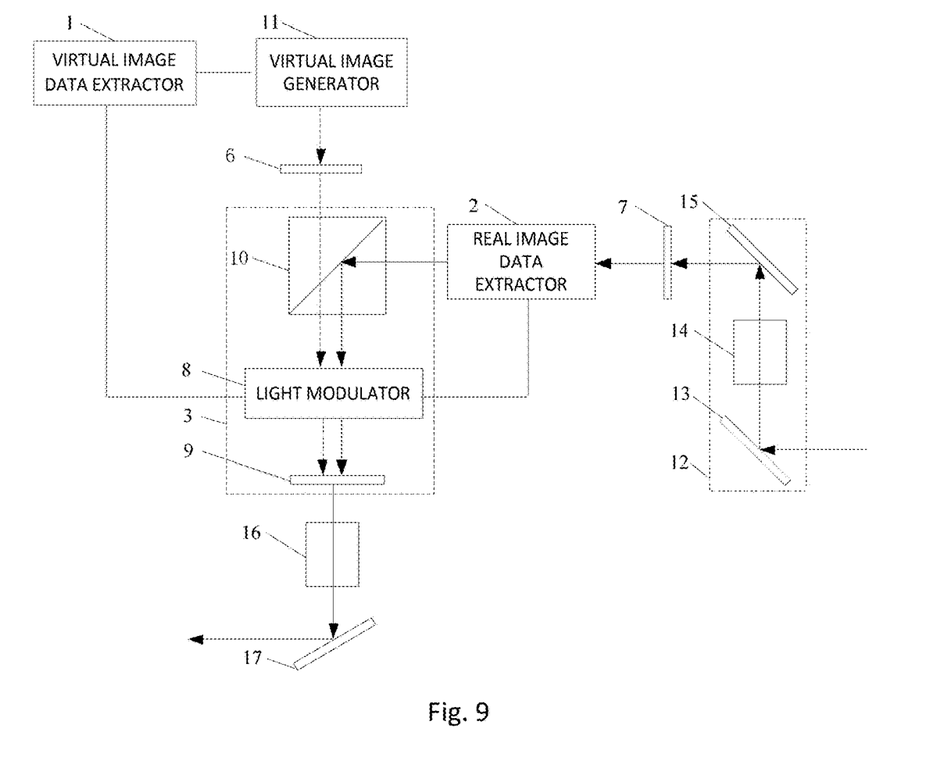
FIG. 9 is another structural schematic view of an augmented reality display apparatus provided by an embodiment of this disclosure.

FIG. 9 shows another structural schematic view of an augmented reality display apparatus provided by an embodiment of this disclosure. As shown in FIG. 9, the augmented reality display apparatus provided by this embodiment may further comprise a virtual image generator 11. The first polarizing device 6 is arranged at a light exit surface of the virtual image generator 11. The virtual image generator 11 is connected with the virtual image data extractor 1. When the augmented reality display apparatus comprises the virtual image generator 11, the virtual image data extractor 1 may be configured to extract the virtual image data based on the virtual image generated by the virtual image generator 11.

In one embodiment, the virtual image generator 11 may comprise a liquid crystal display, and may also comprise an active light emitting device such as a plasma display or an organic light emitting diode display that may emit collimated light. When the virtual image generator 11 is a liquid crystal display, a plasma display, an organic light emitting diode display or other types of display, the virtual image data extractor 1 may extract the virtual image data of the virtual image generated by the virtual image generator 11 through a driving chip in the display.

In one embodiment, the real image data extractor 2 comprised in the augmented reality display apparatus may comprise a spatial light modulator.

In addition, continuing to refer to FIG. 9, in order to ensure that the light of the real image may be transmitted into the second polarizing device 7 accurately, the augmented reality display apparatus may further comprise a real light transmitter 12. The second polarizing device 7 and the real image data extractor 2 are arranged successively at a light exit side of the real light transmitter 12.

The real light transmitter 12 may comprise a first reflecting device 13, an objective lens 14 and a second reflecting device 15. The first reflecting device 13 may be configured to reflect light of the real scene to the objective lens 14, and the second reflecting device 15 may be configured to reflect the light of the real image that is imaged and amplified by the objective lens 14 to the second polarizing device 7.

In addition, continuing to refer to FIG. 9, the augmented reality display apparatus may further comprise an eyepiece 16 and a third reflecting device 17. The eyepiece 16 may be configured to amplify a combined image formed by combining the virtual image and the real image, and the third reflecting device 17 may be configured to transmit the light of the amplified combined image into human eyes.

Figure 10:
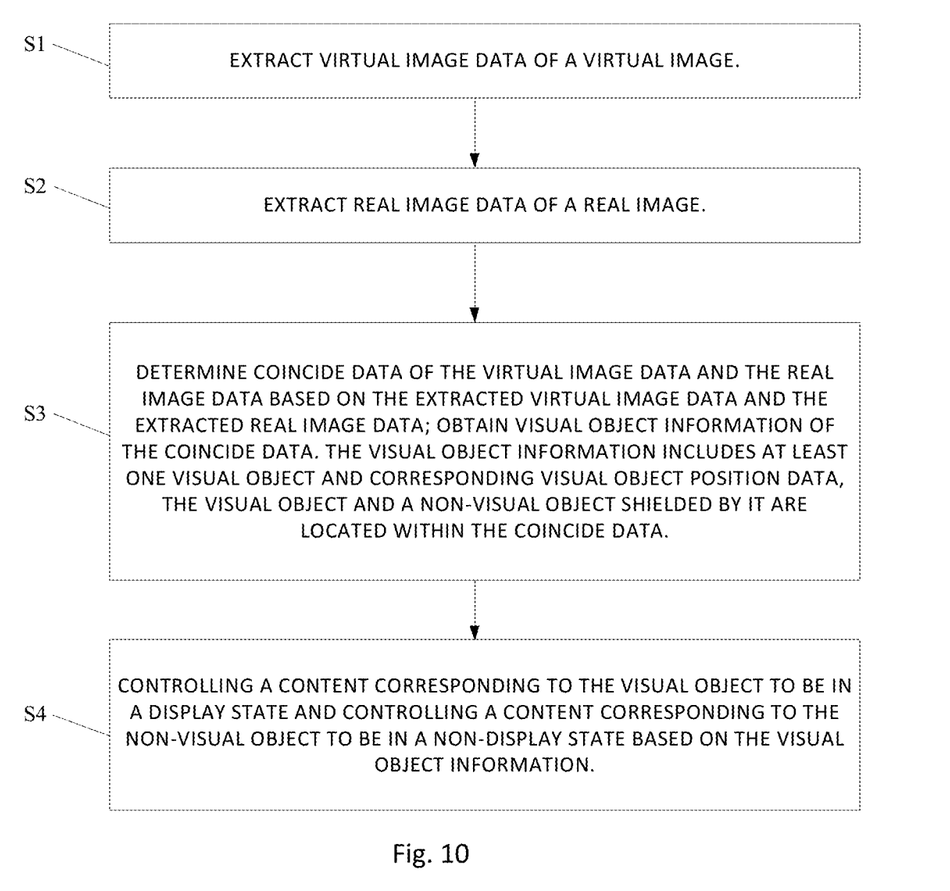
FIG. 10 is a flow chart of an augmented reality display method provided by an embodiment of this disclosure.

FIG. 10 shows a flow chart of an augmented reality display method provided by an embodiment of this disclosure. The augmented reality display method may be applied in the augmented reality display apparatus provided by this disclosure.

As shown in FIG. 10, the augmented reality display method may comprise steps as follows:

Step S1: extracting virtual image data of a virtual image.

Step S2: extracting real image data of a real image.

Step S3: determining coincide data of the virtual image data and the real image data based on the extracted virtual image data and the extracted real image data; obtaining visual object information of the coincide data. The visual object information includes at least one visual object and corresponding visual object position data, the visual object and a non-visual object shield by it are located within the coincide data. In one specific implementation, the visual object information of the coincide data may be received from a user. Or alternatively, the visual object information of the coincide data may be determined locally.

Step S4: controlling a content corresponding to the visual object to be in a display state and controlling a content corresponding to the non-visual object to be in a non-display state based on the visual object information. For example, when the virtual image is in the front, the visual object is the virtual image and then its corresponding content is in the display state, while the non-visual object is the real image and since it is shielded by the virtual image, its corresponding content is in the non-display state; or when the real image is in the front, the visual object is the real image and then its corresponding content is in the display state, while the non-visual object is the virtual image and since it is shielded by the real image, its corresponding content is in the non-display state.

In the above augmented reality display method, the coincide data of the virtual image data and the real image data is determined based on the extracted virtual image data and the extracted real image data, and the content corresponding to the visual object is controlled to be in the display state and the content corresponding to the non-visual object is controlled to be in the non-display state based on the obtained visual object information. In this way, when a certain visual object is a virtual image, and the non-visual object corresponding to it is a real image, the content of a portion in the virtual image corresponding to the visual object may be controlled to be in the display state, and the content of a portion in the real image corresponding to the non-visual object may be controlled to be in the non-display state, i.e., making the user unable to see the portion in the real image that is shielded by the virtual image. When a certain visual object is a real image, and the non-visual object corresponding to it is a virtual image, the content of a portion in the real image corresponding to the visual object may be controlled to be in the display state, and the content of a portion in the virtual image corresponding to the non-visual object may be controlled to be in the non-display state, i.e., making the user unable to see the portion in the virtual image that is shielded by the real image. Therefore, the augmented reality display method may reflect the shielding relationship between the real image and the virtual image intuitively so as to blend the virtual image into the real image better.

It shall be noted that the above definition on the order of extracting the virtual image data of the virtual image and extracting the real image data of the real image is only for schematic explanation. In actual cases, the virtual image data may be extracted firstly and then the real image data is extracted, or the real image data may be extracted firstly and then the virtual image data is extracted. Certainly, the real image data and the virtual image data may also be extracted simultaneously.

In addition, the augmented reality display method may further comprise: converting the light of the virtual image into polarized light, converting the light of the real image into polarized light. The step of converting the light of the real image into polarized light may be performed before extracting the real image data of the real image.

Correspondingly, the step of controlling a content corresponding to the visual object to be in a display state and controlling a content corresponding to the non-visual object to be in a non-display state based on the visual object information in the step S4 may further comprise: modulating a polarization state of polarized light corresponding to contents of the virtual image and the real image located within the coincide data based on the visual object information, so that the polarized light corresponding to contents in the virtual image and the real image serving for the visual object may be transmitted from the third polarizing device, and the polarized light corresponding to contents in the virtual image and the real image serving for the non-visual object to be shielded.

Because the polarized light includes both linearly polarized light and circularly polarized light, on the basis of this, the step of converting the light of the virtual image into polarized light may further comprise: converting the light of the virtual image into linearly polarized light; and the step of converting the light of the real image into polarized light may further comprise: converting the light of the real image into linearly polarized light.

Or alternatively, the step of converting the light of the virtual image into polarized light may further comprise: converting the light of the virtual image into circularly polarized light; and the step of converting the light of the real image into polarized light may further comprise: converting the light of the real image into circularly polarized light.

If the converted light of the virtual image and the converted light of the real image are respectively linearly polarized light, the principles of modulation of the linearly polarized light of the virtual image and the linearly polarized light of the real image may make reference to the preceding description on the linearly polarized light. If the converted light of the virtual image and the converted light of the real image are respectively circularly polarized light, the principles of modulation of the circularly polarized light of the virtual image and the circularly polarized light of the real image may make reference to the preceding description on the circularly polarized light, which will not be repeated herein.

In addition, the augmented reality display method may further comprise: before step S1, generating a virtual image. Correspondingly, the step S1 may further comprise: extracting the virtual image data of the virtual image based on the generated virtual image.

In addition, the augmented reality display method may further comprise: before the step S2, reflecting, by the first reflecting device, the light of the real scene to the objective lens, imaging by the objective lens based on the light of the real scene, and amplifying the real image formed, reflecting by the second reflecting device the light of the real image amplified by the objective lens to the second polarizing device.

In addition, the augmented reality display method may further comprise: after the step S4, amplifying, by the eyepiece, the combined image formed by combining the virtual image and the real image, transmitting, by the third reflecting device, the light of the amplified combined image into human eyes.

It could be understood that what are stated above are merely exemplary embodiments of this disclosure, however, the protection scope of the present disclosure is not limited to this. It should be pointed out that on the premise of not departing from the spirit and the principle of the present disclosure, the ordinary skilled in the art may easily think of various modifications or replacements, these modifications or replacements shall all be encompassed within the protection scope of the present disclosure. For example, in the augmented reality display apparatus, the entrances from which the virtual image and the real image enter the augmented reality display apparatus may be exchanged, which may also carry out the embodiments of this disclosure. The protection scope of this disclosure should be subject to the protection scopes of the claims attached.

It shall be noted that the above embodiments only make illustrations based on the division of the above functional modules. In actual applications, the above functions may be allocated to different functional modules for implementing as needed. The internal structure of the apparatus may be divided into different functional modules so as to implement all or part of the functions described above. In addition, the function of one of the above modules may be implemented by a plurality of modules, and the functions of the above plurality of modules may also be blended into one module for implementing.

The present application uses wordings such as "first", "second", "third" and the like. When there is no additional context, using such wordings is not aimed at implying sequencing, actually, they are only used for identifying. For example, the phrases "a first polarizing device" and "a second polarizing device" do not necessarily indicate that the first polarizing device is located before the second polarizing device spatially, nor indicate that the first polarizing device is operated or processed before the polarizing device temporally. Actually, these phrases are only used for identifying different polarizing devices.

In the claims, none of the references numerals placed in parentheses should be interpreted as limitations to the claims. The term "comprise" does not exclude presence of elements or steps other than the elements or steps listed in the claims. The word "a (an)" or "one" before the element does not exclude presence of a plurality of such element. This disclosure may be carried out by means of hardware comprising a plurality of separate elements, and may also be carried out by appropriately programmed software or firmware, or carried out by any combination thereof.

In the apparatus or system claims in which several devices are listed, one or more of these devices may be reflected in a same hardware item. The fact that only some measures are recited in mutually different dependent claims does not indicate that the combination of these measures could not be utilized advantageously.

The invention claimed is:

1. An augmented reality display apparatus, comprising:
a virtual image data extractor, configured to extract virtual image data of a virtual image;
a real image data extractor, configured to extract real image data of a real image; and
an image controller connected with the virtual image data extractor and the real image data extractor respectively, the image controller being configured to, based on the extracted virtual image data and the extracted real image data, determine coincide data of the virtual image data and the real image data, and obtain visual object information of the coincide data, wherein the visual object information includes at least one visual object and corresponding visual object position data, and the visual object and a non-visual object shielded by it are located within the coincide data;
the image controller being further configured to, based on the visual object information, control a content corresponding to the visual object to be in a display state, and control a content corresponding to the non-visual object to be in a non-display state;
wherein the augmented reality display apparatus further comprises:
a first polarizing device, configured to convert light of the virtual image into polarized light; and
a second polarizing device, configured to convert light of the real image into polarized light,
the image controller comprises a light modulator and a third polarizing device, the light modulator being connected with the virtual image data extractor and the real image data extractor respectively; the light modulator being configured to, based on the extracted virtual image data and the extracted real image data, determine coincide data of the virtual image data and the real image data, and obtain visual object information of the coincide data, based on which a polarization state of polarized light corresponding to the content of the virtual image and the real image located within the coincide data based on the visual object information is modulated, so as to enable the polarized light corresponding to contents in the virtual image and the real image serving for the visual object to be transmitted from the third polarizing device, the third polarizing device and the polarized light corresponding to contents in the virtual image and the real image serving for the non-visual object to be shielded.

2. The augmented reality display apparatus according to claim 1, wherein the first polarizing device comprises a first polarizer, which is configured to convert light of the virtual image into linearly polarized light; the second polarizing device comprises a second polarizer, which is configured to convert light of the real image into linearly polarized light, wherein a polarizing axis direction of the first polarizer is perpendicular to a polarizing axis direction of the second polarizer, and the third polarizing device comprises a third polarizer, wherein a polarizing axis direction of the third polarizer being perpendicular to the polarizing axis direction of the first polarizer;
the image controller further comprises a beam splitter, the beam splitter being configured to transmit the linearly polarized light of the virtual image and the linearly polarized light of the real image to the light modulator;
the light modulator comprises a spatial light modulator, an angle formed between an optical axis direction of liquid crystals in the spatial light modulator in a non-energized state and the polarizing axis direction of the first polarizer being +45°, an angle formed between the optical axis direction of liquid crystals in the spatial light modulator in the non-energized state and the polarizing axis direction of the second polarizer being −45°.

3. The augmented reality display apparatus according to claim 1, wherein the first polarizing device comprises a first polarizer and a first phase retarder of $\lambda/4$ wavelength, and is configured to convert light of the virtual image into circularly polarized light, the second polarizing device comprises a second polarizer and a second phase retarder of $\lambda/4$ wavelength, and is configured to convert light of the real image into circularly polarized light, the third polarizing device comprises a third phase retarder of $\lambda/4$ wavelength and a third polarizer;
wherein an angle formed by a polarizing axis direction of the first polarizer and an optical axis direction of the first phase retarder is a first angle, an angle formed by a polarizing axis direction of the second polarizer and an optical axis direction of the second phase retarder is a second angle, and an angle formed by a polarizing axis direction of the third polarizer and an optical axis direction of the third phase retarder is a third angle, the first angle, the second angle and the third angle being 45° or 135° respectively.

4. The augmented reality display apparatus according to claim 3, wherein the first angle, the second angle and the third angle have an equal degree, the image controller further comprises a beam splitter, the beam splitter being configured to transmit the circularly polarized light of the virtual image to the light modulator, the beam splitter being further configured to change a rotation direction of the circularly polarized light of the real image, and transmit the circularly polarized light of the real image whose rotation direction has been changed to the light modulator.

5. The augmented reality display apparatus according to claim 1, wherein the augmented reality display apparatus further comprises a virtual image generator, the first polarizing device is arranged at a light exit surface of the virtual image generator, the virtual image generator is connected with the virtual image data extractor; the virtual image data extractor is configured to extract virtual image data based on a virtual image generated by the virtual image generator.

6. The augmented reality display apparatus according to claim 5, wherein the virtual image generator is a liquid crystal display, a plasma display or an organic light emitting diode display.

7. The augmented reality display apparatus according to claim 1, wherein the augmented reality display apparatus further comprises a real light transmitter, the second polarizing device and the real image data extractor are arranged successively at a light exit side of the real light transmitter.

8. The augmented reality display apparatus according to claim 7, wherein the real light transmitter comprises a first reflecting device, an objective lens and a second reflecting device; wherein the first reflecting device is configured to reflect light of a real scene to the objective lens, and the second reflecting device is configured to reflect light of a real image that is imaged and amplified by the objective lens to the second polarizing device.

9. The augmented reality display apparatus according to claim 1, wherein the augmented reality display apparatus further comprises an eyepiece and a reflecting device; wherein the eyepiece is configured to amplify a combined image formed by combining the virtual image and the real image, and the reflecting device is configured to transmit light of the amplified combined image into human eyes.

10. The augmented reality display apparatus according to claim 1, wherein the real image data extractor comprises a spatial light modulator.

11. An augmented reality display method, the augmented reality display method comprising:
    extracting virtual image data of a virtual image;
    extracting real image data of a real image;
    determining coincide data of the virtual image data and the real image data based on the extracted virtual image data and the extracted real image data; obtaining visual object information of the coincide data; wherein the visual object information includes at least one visual object and corresponding visual object position data, the visual object and a non-visual object shield by it are located within the coincide data; and
    controlling a content corresponding to the visual object to be in a display state and controlling a content corresponding to the non-visual object to be in a non-display state based on the visual object information;
    wherein the augmented reality display method further comprises: converting light of the virtual image into polarized light, converting light of the real image into polarized light;
    the step of controlling a content corresponding to the visual object to be in a display state and controlling a content corresponding to the non-visual object to be in a non-display state based on the visual object information comprises, modulating a polarization state of polarized light corresponding to contents of the virtual image and the real image located within the coincide data based on the visual object information, so as to enable the polarized light corresponding to contents in the virtual image and the real image serving for the visual object to be transmitted from the third polarizing device, and the polarized light corresponding to contents in the virtual image and the real image serving for the non-visual object to be shielded.

12. The augmented reality display method according to claim 11, wherein,
    the step of converting light of the virtual image into polarized light comprises: converting the light of the virtual image into linearly polarized light; and the step of converting light of the real image into polarized light comprises: converting the light of the real image into linearly polarized light; or
    the step of converting light of the virtual image into polarized light comprises: converting the light of the virtual image into circularly polarized light; and the step of converting light of the real image into polarized light comprises: converting the light of the real image into circularly polarized light.

13. The augmented reality display method according to claim 11, wherein the augmented reality display method further comprises: generating a virtual image before extracting virtual image data of the virtual image;
    the step of extracting virtual image data of the virtual image comprises: extracting the virtual image data of the virtual image based on the generated virtual image.

14. A computer program product, comprising a non-transitory computer readable storage medium for storing an instruction, wherein the instruction, when being executed, enables at least one central processing unit of a computing device to carry out the steps of:
    extracting virtual image data of a virtual image;
    extracting real image data of a real image;
    determining coincide data of the virtual image data and the real image data based on the extracted virtual image data and the extracted real image data; obtaining visual object information of the coincide data; wherein the visual object information includes at least one visual object and corresponding visual object position data, the visual object and a non-visual object shield by it are located within the coincide data; and
    controlling a content corresponding to the visual object to be in a display state and controlling a content corresponding to the non-visual object to be in a non-display state based on the visual object information;
    wherein light of the virtual image is converted into polarized light, and light of the real image is converted into polarized light; and wherein
    the step of controlling a content corresponding to the visual object to be in a display state and controlling a content corresponding to the non-visual object to be in a non-display state based on the visual object information comprises:
    controlling modulation of a polarization state of polarized light corresponding to content of the virtual image and the real image located within the coincide data based on the visual object information, so as to enable the polarized light corresponding to contents in the virtual image and the real image serving as the visual object to be transmitted from the third polarizing device, and the polarized light corresponding to contents in the virtual image and the real image serving for the non-visual object to be shielded.

15. The computer program product according to claim 14, the steps carried out by at least one central processing unit of a computing device further comprises:
    generating a virtual image before extracting virtual image data of the virtual image; and the step of extracting virtual image data of the virtual image comprises: extracting the virtual image data of the virtual image based on the generated virtual image.

* * * * *